(12) United States Patent
Yasuda (10) Patent No.: US 10,699,665 B2
(45) Date of Patent: Jun. 30, 2020

(54) SEMICONDUCTOR DEVICE, PORTABLE TERMINAL DEVICE, AND OPERATION DETECTING METHOD

(71) Applicant: LAPIS SEMICONDUCTOR CO., LTD., Kanagawa (JP)

(72) Inventor: Kosuke Yasuda, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 125 days.

(21) Appl. No.: 14/938,537

(22) Filed: Nov. 11, 2015

(65) Prior Publication Data

US 2016/0139169 A1 May 19, 2016

(30) Foreign Application Priority Data

Nov. 17, 2014 (JP) .................................. 2014-232739

(51) Int. Cl.
G09G 5/00 (2006.01)
G01P 15/08 (2006.01)

(52) U.S. Cl.
CPC .......... *G09G 5/006* (2013.01); *G01P 15/0891* (2013.01)

(58) Field of Classification Search
CPC ................................................... G09G 5/006
See application file for complete search history.

(56) References Cited

U.S. PATENT DOCUMENTS

| | | | | |
|---|---|---|---|---|
| 7,671,756 B2 * | 3/2010 | Herz | ....................... | G06F 3/017 340/539.1 |
| 8,326,569 B2 * | 12/2012 | Lee | ......................... | G06F 3/017 702/141 |
| 8,442,797 B2 | 5/2013 | Kim et al. | | |
| 8,589,113 B2 | 11/2013 | Fujiwara | | |
| 8,996,333 B2 | 3/2015 | Tanaka | | |
| 2005/0274184 A1 * | 12/2005 | Zerbini | ................ | G01P 15/0891 73/514.01 |

(Continued)

FOREIGN PATENT DOCUMENTS

| JP | 2011047879 A | 3/2011 |
|---|---|---|
| JP | 2012146156 A | 8/2012 |

(Continued)

OTHER PUBLICATIONS

Japanese Office Action dated May 29, 2018.

*Primary Examiner* — Nitin Patel
*Assistant Examiner* — Robert M Stone
(74) *Attorney, Agent, or Firm* — Volentine, Whitt & Francos, PLLC (57) ABSTRACT

A semiconductor device including an input unit to which an acceleration signal representing acceleration is input from an acceleration detecting unit installed in a portable terminal device, and a detection unit which detects that a tap operation is performed on the portable terminal device, in a case in which the acceleration signal input to the input unit reaches both of a first threshold value set on the positive side and a second threshold value set on the negative side and a period until the acceleration signal exceeds any one of the first threshold value and the second threshold value and then exceeds the other threshold value is equal to or more than a predetermined first period and is equal to or less than a second period larger than the first period.

9 Claims, 7 Drawing Sheets

(56) References Cited

U.S. PATENT DOCUMENTS

| | | | | |
|---|---|---|---|---|
| 2006/0213267 A1* | 9/2006 | Tronconi | ............ | G01P 15/0891 73/510 |
| 2007/0030587 A1* | 2/2007 | Noda | ................. | G01P 15/0891 360/75 |
| 2008/0192005 A1* | 8/2008 | Elgoyhen | ................ | G06F 3/014 345/158 |
| 2009/0319221 A1* | 12/2009 | Kahn | ................... | A61B 5/1123 702/141 |
| 2010/0073812 A1* | 3/2010 | Shibata | ............... | G01P 15/0891 360/97.12 |
| 2010/0172052 A1* | 7/2010 | Shibata | ............... | G01P 15/0891 360/97.12 |
| 2010/0177057 A1* | 7/2010 | Flint | ..................... | G06F 3/0416 345/174 |
| 2010/0256947 A1* | 10/2010 | Kim | ..................... | G06F 1/1626 702/141 |
| 2011/0054831 A1* | 3/2011 | Fujiwara | ................. | G06F 3/017 702/141 |
| 2011/0087454 A1* | 4/2011 | Lee | ......................... | G06F 3/017 702/124 |
| 2011/0208472 A1* | 8/2011 | Fujiwara | ................. | G01P 13/04 702/141 |
| 2012/0165074 A1* | 6/2012 | Soldan | .................. | G06F 3/0488 455/566 |
| 2014/0152563 A1* | 6/2014 | Ouchi | ................... | G06F 3/0487 345/158 |
| 2015/0268265 A1* | 9/2015 | Yonezawa | ............ | G01P 15/036 73/514.01 |
| 2017/0364152 A1* | 12/2017 | Matsuda | ................ | G06F 3/014 |

FOREIGN PATENT DOCUMENTS

| | | |
|---|---|---|
| JP | 2012522324 A | 9/2012 |
| JP | 2014-153729 A | 8/2014 |

* cited by examiner

SEMICONDUCTOR DEVICE, PORTABLE TERMINAL DEVICE, AND OPERATION DETECTING METHOD

CROSS-REFERENCE TO RELATED APPLICATION

This application claims priority under 35 USC 119 from Japanese Patent application No. 2014-232739 filed on Nov. 17, 2014, the disclosure of which is incorporated by reference herein.

BACKGROUND

1. Technical Field

The present disclosure relates to a semiconductor device, a portable terminal device, and an operation detecting method.

2. Related Art

In recent years, a portable terminal device is realized, the portable terminal device having a function of detecting movement (motion) intended by a user for a predetermined operation using an acceleration sensor installed therein, and sensing the operation corresponding to user's intent according to the detection result. As one of such an operation, an operation generally referred to as "tap", which is an operation of slightly tapping an arbitrary portion of a case or a display of a portable terminal device, has been known.

The tap operation generally corresponds to a specific function (operation) which is intended to be executed on a portable terminal device by a user. For example, in a case in which a power source of the portable terminal device in a standby state (sleep state) is intended to be turned on, the power source may be turned on by the user by tapping a certain portion of the portable terminal device. The tap operation is not limited to one tap, may be two or more tap operations. In this case, the operations are referred to as "double tap" (two tap operations), "triple tap" (three tap operations), and the like according to the number of tap operations. One tap operation may be referred to as "single tap" in correspondence with the designation of multiple tap operations. Generally, different functions which a user intends to execute may be associated according to the number of tap operations.

As a document about the tap operation, a portable terminal disclosed in Japanese Patent Application Laid-Open (JP-A) No. 2014-153729 has been known. In the portable terminal disclosed in JP-A No. 2014-153729, it is determined whether there is tapping based on a detection signal (vibration signal) from an acceleration sensor and whether detected vibration is erroneous vibration. An erroneous vibration determination period is disposed before and after a tap determination period in a tap detecting process period and, if vibration in the erroneous vibration determination period is determined as erroneous vibration, the tap detecting process period is initialized and the tap determination is performed again. In the erroneous vibration determination period, it is determined whether there is erroneous vibration using a threshold value TH2 and, in the tap determination period, it is determined whether there is tapping using a threshold value TH1 that is larger than a threshold value TH2.

In the portable terminal disclosed in JP-A No. 2014-153729 having the configuration, erroneous vibration can be determined immediately before or immediately after the tap determination period, and there is no period in which erroneous vibration cannot be appropriately determined. For this reason, even in a situation in which it is difficult to discriminate between vibration based on a tap operation and erroneous vibration (for example, vibration generated when putting a portable terminal on the table), it is possible to suppress occurrence of erroneous detection.

When a threshold value is set to an acceleration signal to detect a predetermined operation (for example, a tap operation), detection precision depends on the set value of the threshold value. For example, it is preferable that the threshold value of the acceleration signal is set to be small for the discrimination from an operation of greatly shaking a portable terminal (so-called shaking operation).

However, when the threshold value is set to be too small, an acceleration signal based on an operation of walking with a portable terminal may be erroneously detected as a tap operation. When increasing the threshold value in consideration of this point, a tap operation may not be detected in a case in which a tapping force in a stationary state is weak.

From this point, in the portable terminal disclosed in JP-A No. 2014-153729, when a user is walking with the portable terminal, that is, when erroneous vibration continuously occurs, it is expected that a tap detecting process may be frequently operated, and thus it may be difficult to detect the tap operation during walking. In other words, from the view point of discrimination between a tap operation and erroneous vibration, and from the view point of rapid detection of an operation related to the view point, there is a room for improvement. In addition, in the portable terminal disclosed in JP-A No. 2014-153729, two threshold values TH1 and TH2 are used, but the threshold value TH2 is a threshold value used for determination of erroneous vibration, and a tap operation is not directly detected using both threshold values TH1 and TH2.

The present disclosure provides a semiconductor device capable of suppressing erroneous detection and rapidly detecting an operation, a portable terminal device, and an operation detecting method.

SUMMARY

A first aspect of the present disclosure is a semiconductor device including an input unit to which an acceleration signal representing acceleration is input from an acceleration detecting unit installed in a portable terminal device, and a detection unit which detects that a tap operation is performed on the portable terminal device, in a case in which the acceleration signal input to the input unit reaches both of a first threshold value set on the positive side and a second threshold value set on the negative side and a period until the acceleration signal exceeds any one of the first threshold value and the second threshold value and then exceeds the other threshold value is equal to or more than a predetermined first period and is equal to or less than a second period larger than the first period.

A second aspect of the present disclosure is a portable terminal device including the semiconductor device according to the first aspect, an acceleration detecting unit which inputs the acceleration signal to the input unit, and a control unit which performs a process corresponding to the tap operation based on the detection result of the detection unit.

A third aspect of the present disclosure is an operation detecting method including inputting an acceleration signal representing acceleration from an acceleration detecting unit installed in a portable terminal device, and detecting that a tap operation is performed on the portable terminal device, in a case in which the input acceleration signal reaches both of a first threshold value set on the positive side and a second threshold value set on the negative side and a period until the acceleration signal exceeds any one of the first threshold value and the second threshold value and then exceeds the other threshold value is equal to or more than a predetermined first period and is equal to or less than a second period larger than the first period.

According to the present disclosure, it is possible to provide a semiconductor device, a portable terminal device and an operation detecting method capable of suppressing erroneous detection and rapidly detecting an operation.

BRIEF DESCRIPTION OF THE DRAWINGS

Exemplary embodiments of the present disclosure will be described in detail based in the following figures, wherein.

DETAILED DESCRIPTION

Hereinafter, an embodiment according to the present disclosure will be described in detail with reference to the accompanying drawings.

Figure 1:
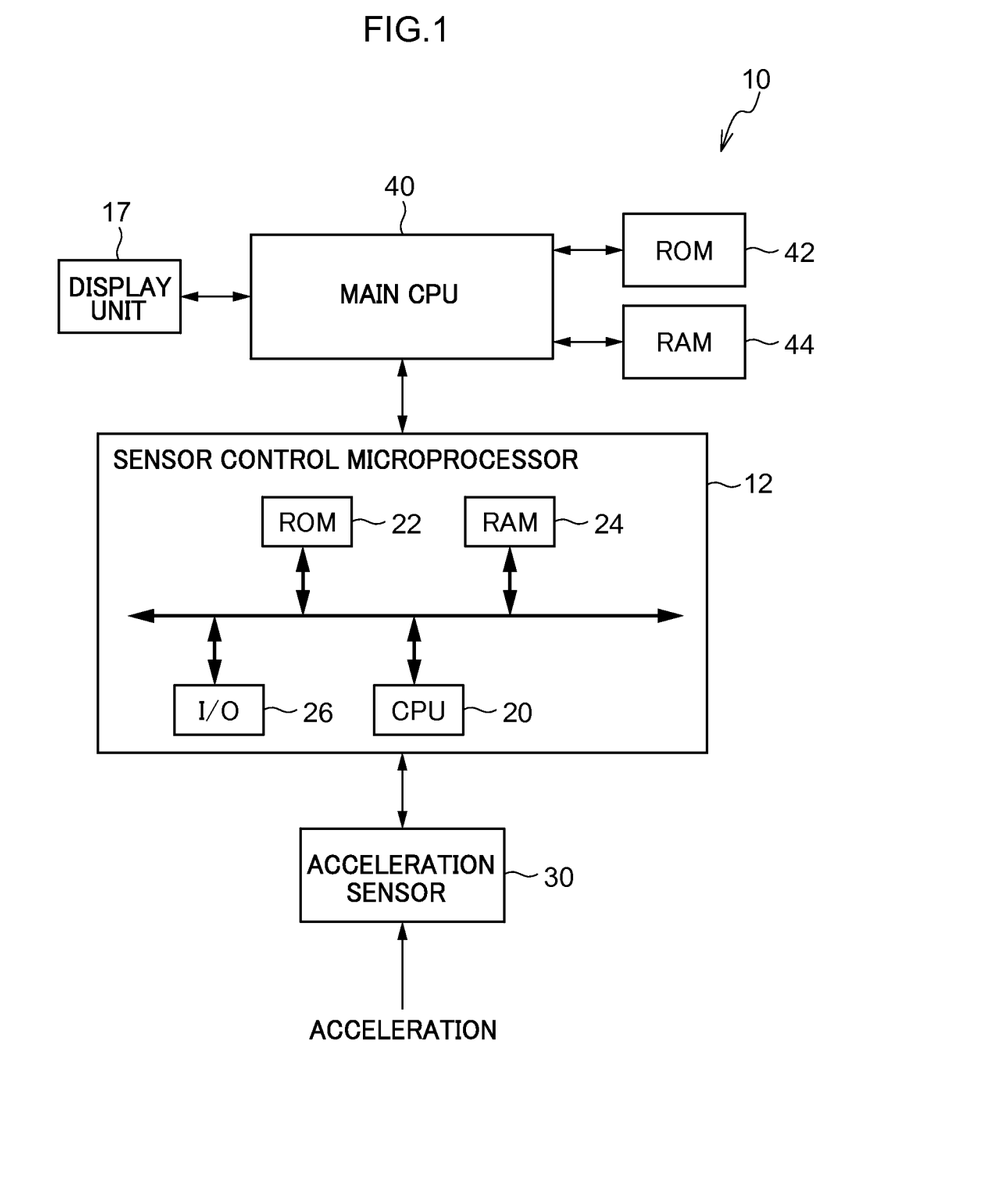
FIG. 1 is a functional block diagram illustrating an example of a functional configuration of a portable terminal device according to an embodiment of the present disclosure.

FIG. 1 is a block diagram illustrating a functional configuration of a portable terminal device 10 according to the embodiment. As illustrated in FIG. 1, the portable terminal device 10 includes a main central processing unit (CPU) 40, a sensor control microprocessor 12 connected to the main CPU 40, a read only memory (ROM) 42, a random access memory (RAM) 44, a display unit 17, and an acceleration sensor 30.

The main CPU 40 executes a program stored in the ROM 42, and realizes various functions of the portable terminal device 10. The RAM 44 is used as a work memory or the like when the main CPU 40 executes the program.

The display unit 17 has a function of displaying a screen for inputting various instructions to the portable terminal device 10, and various process results processed in the portable terminal device 10. A specific example of the display unit 17 may be a touch panel or a liquid crystal display.

The sensor control microprocessor 12 includes a CPU 20, a ROM 22, a RAM 24, and an input/output port (I/O) 26, and is connected to the main CPU 40 through the I/O 26. The sensor control microprocessor 12 mainly performs a function of controlling a sensor such as the acceleration sensor 30 connected to the I/O 26. The I/O 26 may be connected to another sensor (not illustrated), for example, a barometric pressure sensor, a geomagnetic sensor, or a global positioning system (GPS). A semiconductor device according to the embodiment is realized by using the sensor control microprocessor 12 as a main unit.

The CPU 20 executes various programs stored in the ROM 22 such as a tap detecting processing program to be described later, so as to realize a predetermined function. The RAM 24 is used as a work memory or the like during the execution of the programs by the CPU 20. The CPU 20, the ROM 22, the RAM 24, and the I/O 26 are connected to each other through a bus 28.

In the portable terminal device 10 according to the embodiment, the sensor control microprocessor 12 collects a sense signal from the acceleration sensor 30 (or another sensor), performs a predetermined process on the sense signal as necessary, and transmits the sense signal to the main CPU 40, and the main CPU 40 performs a predetermined process based on a detection signal detected by the acceleration sensor 30. For example, the sensor control microprocessor 12 detects a single tap operation by a signal from the acceleration sensor 30 and transmits the detection signal to the main CPU 40, and the main CPU 40 controls the display unit 17 to turn on a power source of the display unit 17.

The acceleration sensor 30 detects a value of acceleration applied to the portable terminal device 10 in time series, and outputs the detection result as an acceleration signal to the sensor control microprocessor 12. The acceleration sensor 30 according to the embodiment is not particularly limited, and may be, for example, a sensor which detects an acceleration value of one specific axis and a sensor which detects each of acceleration values of a plurality of acceleration axes (two axes or three axes). In a case in which the acceleration sensor 30 is the sensor which detects the acceleration value of one axis, the acceleration value of the axis is output as a result of detection. If the acceleration sensor 30 is the sensor which detects the acceleration values of the plurality of axes, the acceleration value for each axis is output as a result of detection. In the embodiment, hereinafter, an aspect of using a 3-axis acceleration sensor 30 will be described exemplarily.

Figure 2:
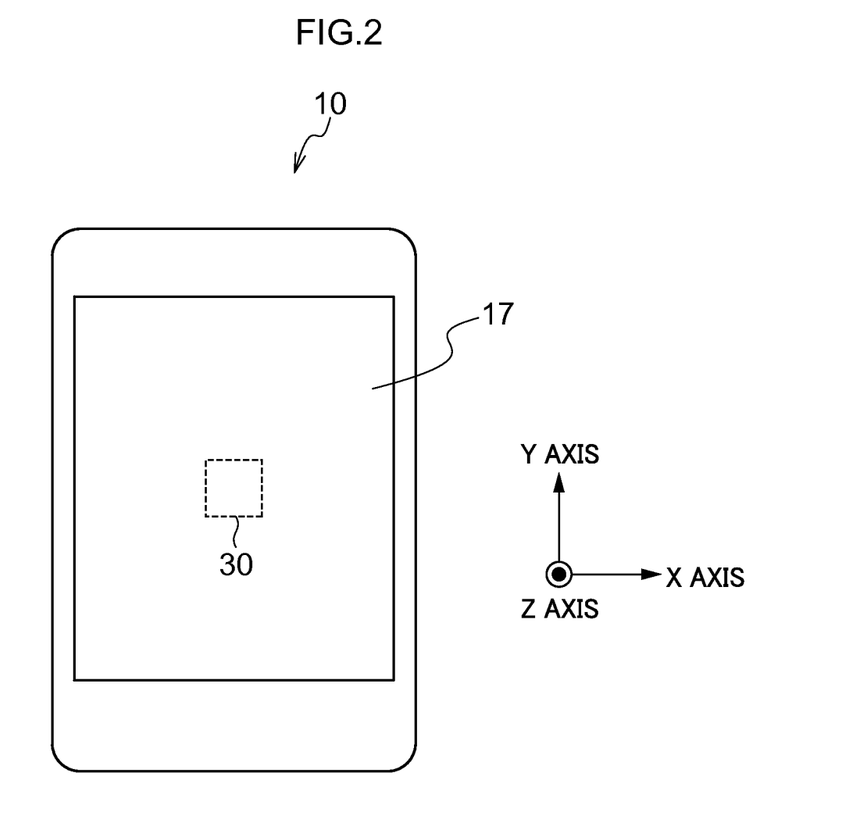
FIG. 2 is a plan view illustrating an overview of the portable terminal device according to the embodiment.

Next, relationships between three axes of the acceleration sensor 30 and a direction of the overview of the portable terminal device 10 will be described with reference to FIG. 2. FIG. 2 is a plan view illustrating an overview of the portable terminal device 10 when viewed from the side on the display unit 17 together with the acceleration sensor 30. Hereinafter, the display unit 17 side of the portable terminal device 10 may be referred to as "front side" and the opposite side to the display unit 17 may be referred to as "back side".

Three axes of X axis, Y axis, and Z axis (right-handed orthogonal coordinate system) of the acceleration sensor 30 of the portable terminal device 10 according to the embodiment are defined as illustrated in FIG. 2. In this case, when the portable terminal device 10 is moved, an acceleration signal corresponding to each component of X axis, Y axis, and Z axis of movement vectors is output from the acceleration sensor 30, and the CPU 20 receives the acceleration signal through the I/O 26 and the bus 28. The CPU 20 analyzes the acceleration signal, necessary information is transmitted to the main CPU 40 through the bus 28 and the I/O 26, and the main CPU 40 performs a necessary process based on the information.

Figure 3A:
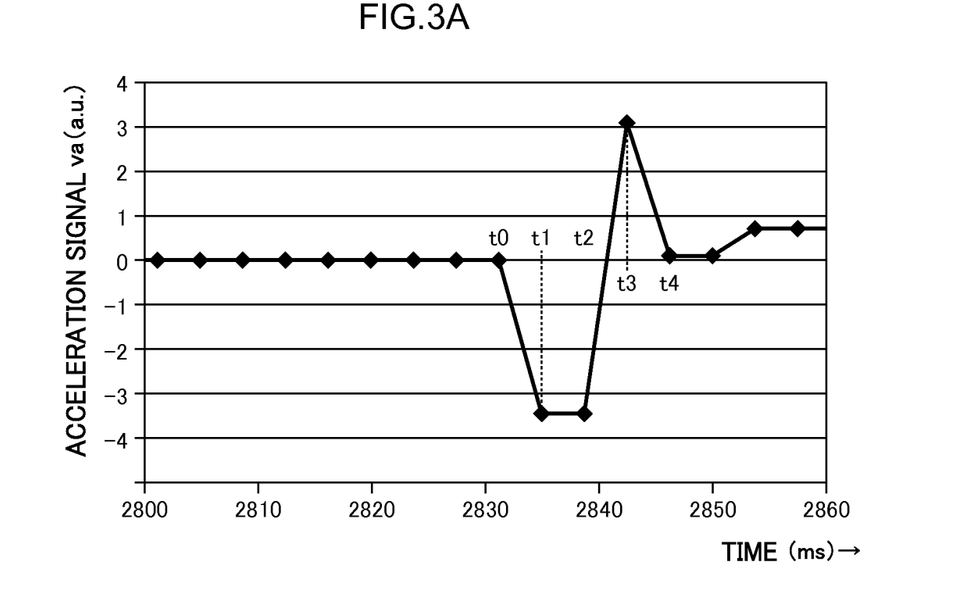
FIGS. 3A and 3B are diagrams illustrating an acceleration signal in the case of a tap operation according to the embodiment.

FIG. 3A illustrates a change in an acceleration signal with respect to time when a user performs a tap operation on the front side of the portable terminal device 10 as an operation corresponding to a desired operation which the user wants to cause the portable terminal device 10 to perform. FIG. 3A illustrates a Z-axis component va (variation component of acceleration) of the acceleration signal when a user performs the tap operation (single tap) on the screen of the display unit 17 downward from the upside (that is, in a negative direction along the Z axis) as an example of the tap operation. In FIG. 3A, a horizontal axis denotes a time represented by millisecond (ms), and a vertical axis denotes an acceleration signal va represented by an arbitrary unit (a.u.). The acceleration signal va is, for example, a value obtained by analog/digital conversion (A/D conversion) of a value representing acceleration detected by the acceleration sensor 30.

As illustrated in FIG. 3A, when the single tap is performed on the front side of the portable terminal device 10, the acceleration signal va represents a pulse phase waveform in which the acceleration signal is first swung from the position of 0 to the negative side (−Z direction) and is subsequently swung to the positive side (+Z direction). More specifically, the tap pulse starts at time t0, reaches a negative side peak (va≈−3.4) at time t1, and crosses the va axis (va=0) at time t2, reaches a positive side peak (va≈+3.0) at time t3, and the value of the acceleration signal va returns to substantially 0 at time t4 (the tap operation is ended). Hereinafter, the pulse waveform illustrated in FIG. 3A generated by the tap operation may be referred to as "tap pulse". In the embodiment, detection of acceleration of gravity by the acceleration sensor 30 is not considered.

Figure 3B:
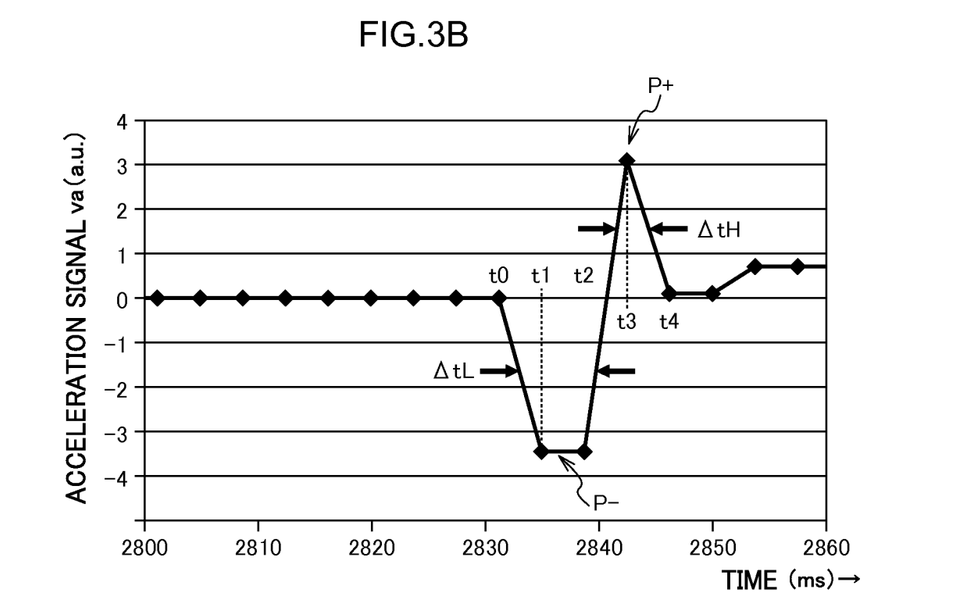

The negative side pulse P− illustrated in FIG. 3B (illustrating FIG. 3A again) is a pulse based on movement caused by the tap operation, and the positive side pulse P+ is a pulse corresponding to recoil (variation by reaction) to the tap operation. Hereinafter, the pulse caused by the tap operation and the pulse caused by the recoil will be described.

As illustrated in FIG. 3B, a pulse width ΔtL represented by a full width at half maximum (FWHM) of the negative side pulse P− is larger than a pulse width ΔtH represented by FWHM of the positive side pulse P+(ΔtL>ΔtH). This is a difference based on the difference between the acceleration signal in the case of actually moving by pushing and the acceleration signal in the case of moving by recoil to the movement, and is general characteristics.

The method of representing the pulse width is not limited to FWHM, and the pulse width may be represented by difference in time between va=0 and an intersection point, that is, the pulse width ΔtL of the negative side pulse width P− may be represented by ΔtL=(t2−t0), and the pulse width ΔtH of the positive side pulse width P+ may be represented by ΔtH=(t4−t2). In the example of the tap operation illustrated in FIG. 3A, when the pulse width is represented by FWHM, the pulse width is ΔtL 7 ms and ΔtH 3 ms.

In the embodiment, as a characteristic, it is possible to detect the tap operation with high precision by using both pulses of the pulse (negative side pulse P− illustrated in FIG. 3B) caused by the tap operation and the pulse (positive side pulse P+ illustrated in FIG. 3B) caused by the recoil. In the embodiment, as another characteristic, paying attention to characteristics of a tap pulse in which a time width of a pulse caused by the tap operation is relatively long, oscillation occurring in the time width of the pulse caused by the tap operation is determined as erroneous vibration. In the detection of the tap operation according to the embodiment, the characteristics described above are provided, so that it is possible to detect the tap operation while suppressing erroneous detection, even in a situation in which a pulse (oscillation) of the acceleration signal va which is not caused by the tap operation is mixed.

FIG. 3A illustrates a waveform (Z-axis component of the acceleration signal va) of a tap pulse when the single tap is performed on the front side of the portable terminal device 10 as described above. On the contrary, even when the single tap is performed on the back side, the waveform of the tap pulse is observed as illustrated in FIG. 3A. The pulse waveform in this case is a waveform in which the pulse waveform illustrated in FIG. 3A is folded with respect to the time axis, that is, a waveform in which the first generated positive side pulse P+ and the subsequently generated negative side pulse P− are synthesized. In this case, the pulse width ΔtH of the positive side pulse P+ and the pulse width ΔtL of the negative side pulse P− have the relation of ΔtH>ΔtL.

Next, oscillation of the acceleration signal va generated in the acceleration sensor 30 by movement to be discriminated from the tap operation in movements (motions) applied to the portable terminal device 10 will be described.

Figure 4A:
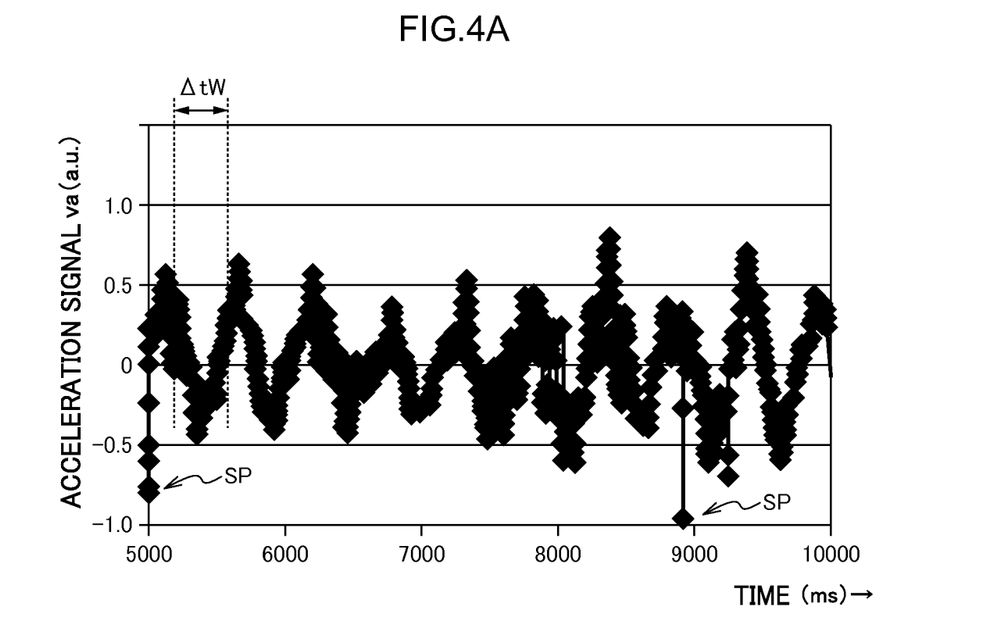
FIGS. 4A and 4B are diagrams illustrating an acceleration signal and a pulse width when a user walks with the device according to the embodiment, and a pulse width in an acceleration signal in the case of a tap operation according to the embodiment.

FIG. 4A illustrates an acceleration signal va in the case of walking with the portable terminal device 10. Units of the vertical axis and the horizontal axis in FIG. 4A are the same as those in FIGS. 3A and 3B, that is, the horizontal axis denotes a time represented by ms, and the vertical axis denotes the acceleration signal va represented by an arbitrary unit. However, as for the acceleration signal va, the same numeral in FIGS. 3A, 3B, and 4A represents the same magnitude of the acceleration signal. Hereinafter, a periodical pulse waveform of the acceleration signal when walking illustrated in FIG. 4A may be referred to as "walking pulse".

As illustrated in FIG. 4A, in the case of a walking pulse, the value of the acceleration signal va is a value in the range of about from −0.7 to +0.7. A time width from a peak to the next peak in the walking pulse is a value of several 100 ms. On the contrary, in the case of a tap pulse, as illustrated in FIG. 3A, the value of the acceleration signal va is a value of about from −3.0 to +3.0, and a time width from the negative side peak of the tap pulse to the positive side peak is several ms. In other words, it can be known that the tap pulse and the walking pulse are significantly different in all of the range of the value of the acceleration signal va and the pulse width. Note that an acceleration signal of a narrow pulse width denoted by SP in FIG. 4A is a surge-shaped acceleration signal unexpectedly generated during walking.

Next, a tap detecting method according to the embodiment based on recognition about difference between the tap pulse and the walking pulse described above will be described with reference to FIGS. 4A, 4B, and 5.

Figure 4B:
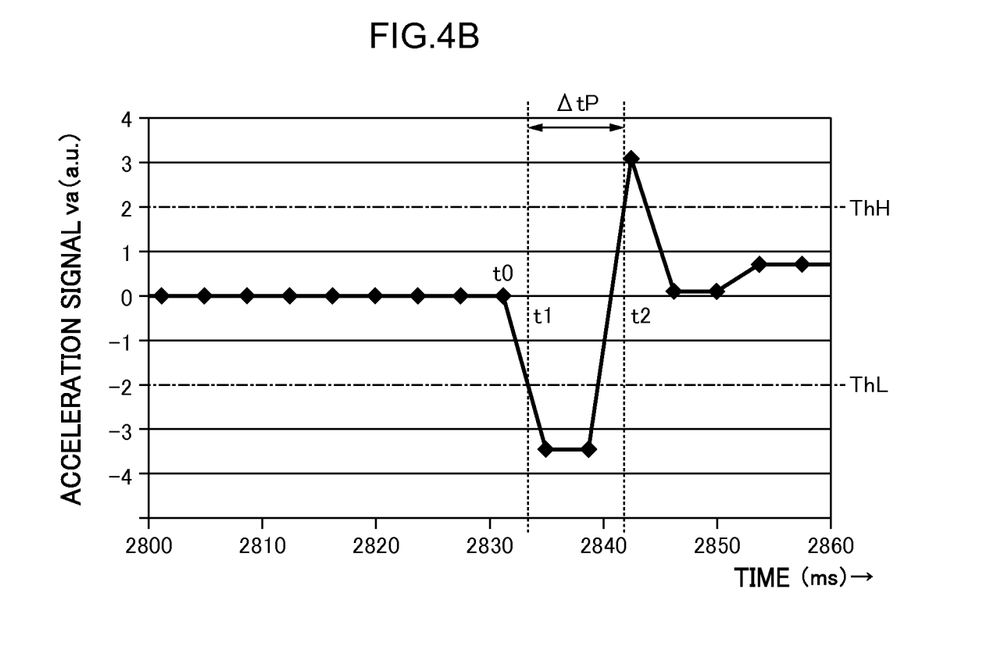

As illustrated in FIG. 4B (illustrating FIGS. 3A and 3B again), in the tap detecting process according to the embodiment, two threshold values ThL and ThH (ThL<ThH) of the acceleration signal for discriminating the tap pulse from the walking pulse are set. From FIG. 4A, it is necessary that the threshold value ThL is at least equal to or less than −0.7 and the threshold value ThH is at least equal to or more than +0.7. However, in the embodiment illustrated in FIG. 4B, the threshold value ThL is −2.0 and the threshold value ThH is +2.0 as an example. In other words, in the embodiment, one condition of the tap operation detection is to exceed both of the threshold value ThL and the threshold value ThH.

In the embodiment, as a time width of a pulse for discriminating a tap pulse from a walking pulse, a pulse width ΔtP is defined. As illustrated in FIG. 4B, the pulse width ΔtP is defined as a difference between time t1 at a point where the acceleration signal va falling by the tap operation at time t0 intersects with the threshold value ThL and time t2 at a point where the acceleration signal va rising by recoil intersects with the threshold value ThH, that is, $\Delta tP=(t2-t1)$. As a second condition of detecting the tap pulse, Formula (1) represented below is defined.

$$\Delta t1 \leq \Delta tP \leq \Delta t2 \qquad \text{Formula (1)}$$

A lower limit $\Delta t1$ is a threshold value for excluding detection of the acceleration signal va with a narrow width such as unexpected disturbance (for example, an acceleration signal in the case of putting the portable terminal device 10 on the table), and may be set, for example, based on experiments of generating the unexpected disturbance. An upper limit $\Delta t2$ is a threshold value for discriminating the tap pulse from the walking pulse, and may be set, for example, based on a period $\Delta tW$ of the walking pulse illustrated in FIG. 4A.

Specific numerical values of the parameter will be described. From FIG. 4B, it can be known that the pulse width $\Delta tP$ is about 10 ms. From FIG. 4A, it can be known that the period $\Delta tW$ of the walking pulse is about 400 ms. From the above description, $\Delta t1=1$ ms and $\Delta t2=100$ ms are set.

Figure 5:
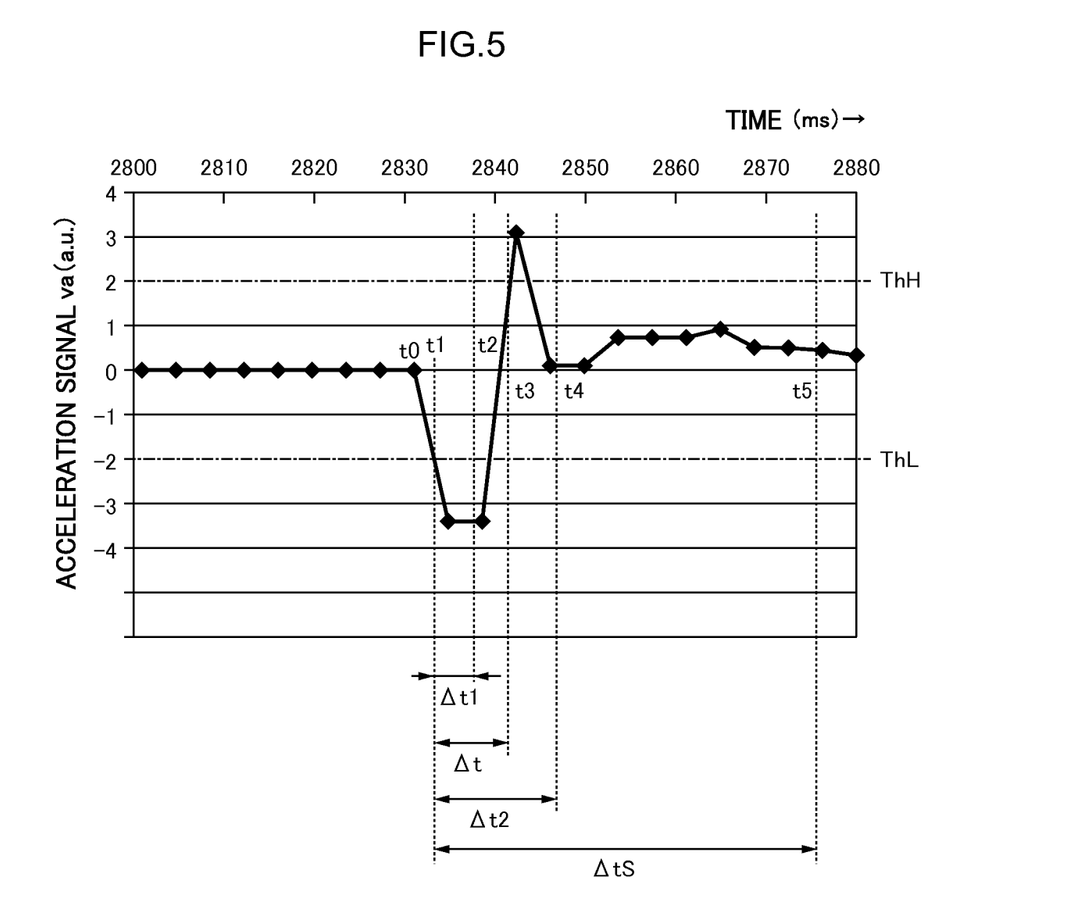
FIG. 5 is a diagram for describing detection of a tap operation according to the embodiment.
Figure 6:
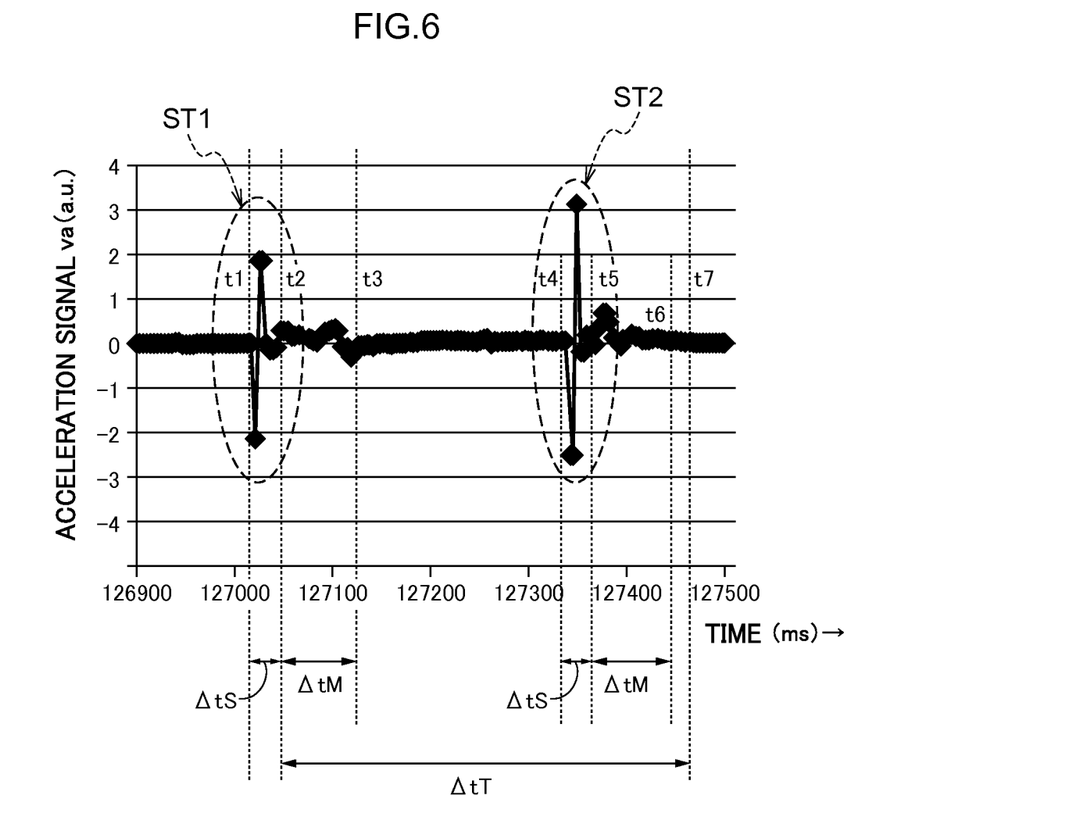
FIG. 6 is a diagram for describing detection of a single tap and a double tap according to the embodiment.
Figure 7:
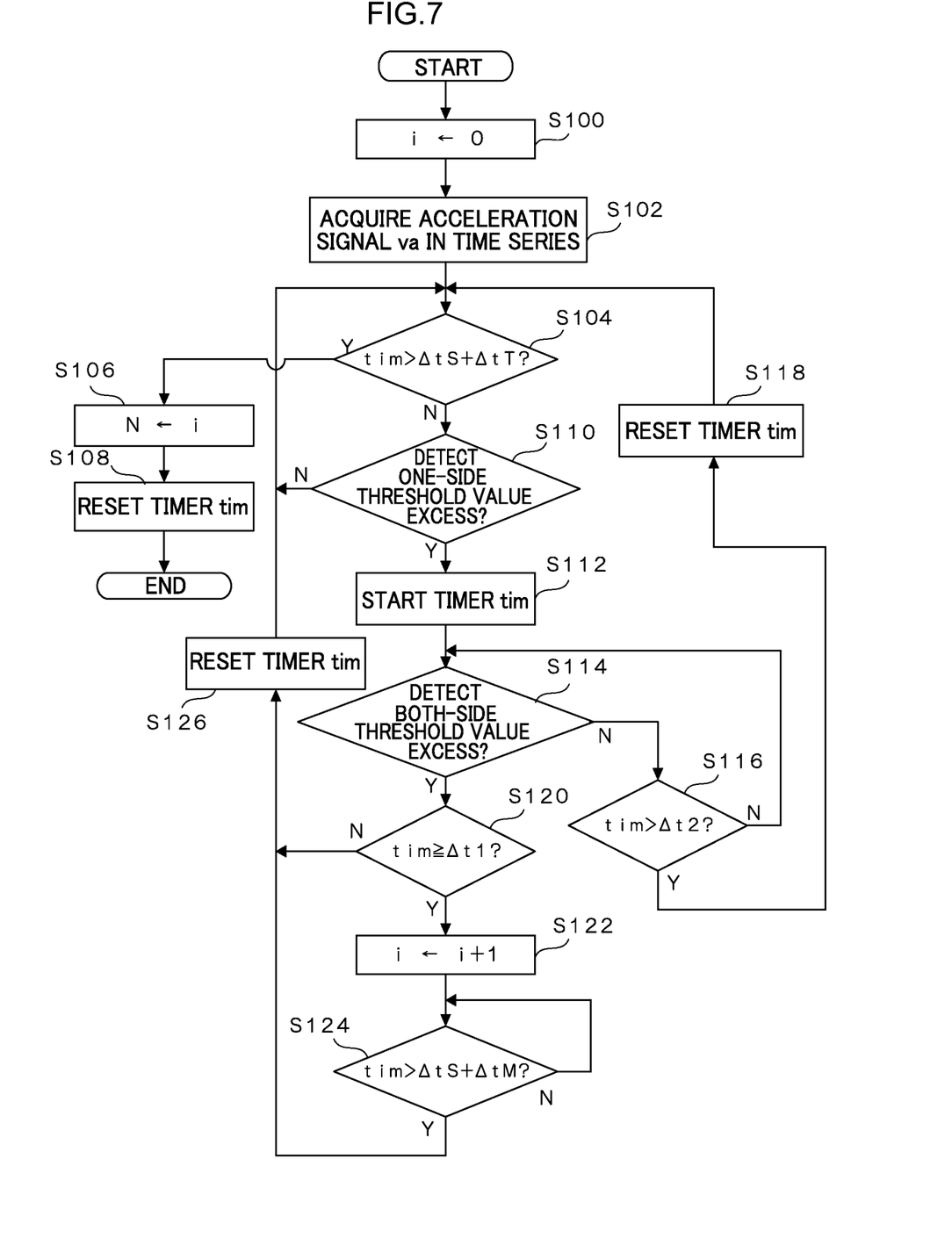
FIG. 7 is a flowchart illustrating a flow of a tap detecting process according to the embodiment.

Next, a tap detecting process that is process flow in the case of detecting the tap operation based on the tap detecting method will be described with reference to FIGS. 5 to 7. FIG. 5 illustrates a time waveform of an acceleration signal va in the case of detecting the single tap, FIG. 6 illustrates a time waveform of an acceleration signal va in the case of detecting the double tap, and FIG. 7 is a flowchart illustrating a flow of the tap detecting process.

First, a sequence of a single tap detecting process will be described with reference to FIG. 5 (illustrating FIG. 3A again). In FIG. 5, a tap pulse of the single tap is generated from time t0 to time t4. In the tap detecting process according to the embodiment, as described above, it is determined that the single tap operation is performed when the following two conditions of (A) and (B) are satisfied.

(A) The acceleration signal va exceeds the threshold value ThL and then exceeds the threshold value ThH, or exceeds the threshold value ThH and then exceeds threshold value ThL.

(B) The pulse width of the pulse waveform of the acceleration signal va satisfies a predetermined condition.

Hereinafter, a case of exceeding the threshold value ThL or the threshold value ThH for the first time may be referred to as "one-side threshold value excess", and a case of exceeding the threshold value ThL and then exceeding the threshold value ThH, or exceeding the threshold value ThH and then exceeding the threshold value ThL may be referred to as "both-side threshold value excess".

In the condition (A), for example, a waveform illustrated in FIG. 4B satisfies the condition. In other words, in FIG. 4B, the acceleration signal va exceeds the threshold value ThL and then exceeds the threshold value ThH. Hereinafter, the condition (B) will be described in more detail with reference to FIG. 5.

As illustrated in FIG. 5, the falling of the negative side pulse P− (see FIG. 3B) of the tap pulse generated at time t0 intersects with the threshold value ThL at time t1, it becomes va=0 at time t2, and the raising of the positive side pulse P+(see FIG. 3B) intersects with the threshold value ThH at time t3. In this case, the determination time width $\Delta t$ of determining whether it is the tap pulse is determined in the following Formula (2).

$$\Delta t = t3 - t1 \qquad \text{Formula (2)}$$

In the tap detecting process according to the embodiment, when the determination time with $\Delta t$ satisfies the following Formula (3), it is determined from Formula (1) that the pulse waveform of the acceleration signal va is generated by the single tap.

$$\Delta t1 \leq \Delta t \leq \Delta t2 \qquad \text{Formula (3)}$$

FIG. 5 illustrates an example of a pulse waveform when Formula (3) is satisfied.

On the other end, even when both-side threshold value excess occurs and in the case of $\Delta t<\Delta t1$ or $\Delta t>\Delta t2$, it is not determined that the single tap operation is performed. The reason is because, in the case of $\Delta t<\Delta t1$, a probability of occurrence of the pulse of the acceleration signal va having the pulse width narrower than that of the tap pulse by unexpected disturbance is high, and in the case of $\Delta t>\Delta t2$, for example, a probability of occurrence of the pulse of the acceleration signal va having a long period such as walking is high.

In addition, in the tap detecting process according to the embodiment, the determination is performed in consideration of a predetermined period from the time of one-side threshold value excess of the acceleration signal va, and hereinafter, the predetermined period may be referred to as "single tap detection period $\Delta tS$". In FIG. 5, when the single tap detection period $\Delta tS$ elapses from time t1, the single tap detection period is ended at time t5, that is, $\Delta tS=(t5-t1)$.

In the embodiment, the remaining time (t5-t4) after detecting the single tap in the single tap detection period $\Delta tS$ is an invalid period in which the detection of the pulse of the acceleration signal va is not performed. This is a so-called protective time not to erroneously detect the disturbance pulse with a shorter distance between pulses than that of the tap pulse, as the tap pulse after the second.

In other words, in the tap pulse determining method in the tap detecting process according to the embodiment described above, two threshold values are defined for each of the pulse width and the acceleration signal va, a rectangular mask (window) defined by four threshold values is set, and the pulse of the acceleration signal va satisfying the mask is determined as the tap pulse.

Next, a double tap detecting process will be described with reference to FIG. 6. In FIG. 6, one-side threshold value excess occurs at time t1, a single tap ST1 occurs, and the single tap detection period $\Delta tS$ is ended at time t2. That is, the single tap detection period is $\Delta tS=(t2-t1)$. In addition, one-side threshold value excess occurs at time t4, the second single tap ST2 occurs, and the single tap detection period $\Delta tS$ is ended at time t5. That is, the single tap detection period is $\Delta tS=(t5-t4)$. In the tap detecting process according to the embodiment, the double tap operation is detected by the occurrence of the single tap ST2, and the single tap ST1 and the single tap ST2 are detected in the same sequence.

In the embodiment, when the first single tap operation (in the example illustrated in FIG. 6, the single tap ST1) is detected and then the second single tap operation (in the example illustrated in FIG. 6, the single tap ST2) is detected within a predetermined period, the double tap operation is detected by the detection of the second single tap operation. Hereinafter, the predetermined period may be referred to as "tap detection period $\Delta tT$". In the embodiment, the tap detection period $\Delta tT$ is started from the time when the detection of the first single tap operation is ended, that is, time t2 illustrated in FIG. 6. In the example illustrated in FIG. 6, the tap detection period $\Delta tT$ started from time t2 is ended at time t7 (that is, $\Delta tT=(t7-t2)$), the single tap ST2 is detected in the tap detection period ΔtT, and thus the double tap operation is detected by the detection of the single tap ST2.

In the embodiment, the description has been made about the tap detection period ΔtT in a case in which the double tap operation is detected as an example, but the present disclosure is not limited thereto, and the tap detection period ΔtT may be set according to the number of detected tap operation times to detect the tap operation three times or more.

In the embodiment, after the single tap detection period ΔtS elapses, an invalid period ΔtM in which the detection of the pulse of the acceleration signal va is not performed is provided. The invalid period ΔtM is a so-called protective time not to erroneously detect the disturbance pulse with a shorter distance between pulses than that of the tap pulse, as the tap pulse.

Next the flow of the tap detecting process described above will be described in more detail with reference to the flowchart illustrated in FIG. 7. The tap detecting process illustrated in FIG. 7 is a process of determining whether a tap pulse is detected and the tap operation is detected, and detecting how many tap operation are executed if the tap operation is detected.

In the embodiment, the description will be made about a case where the flow of the tap detecting process illustrated in FIG. 7 is configured as a program executed by the CPU 20 of the sensor control microprocessor 12. The tap detecting process program in this case may be stored in advance, for example, in the ROM 22 or the ROM 42. However, the present disclosure is not limited thereto, and an aspect of being provided in a state where the tap detection process program is stored in a computer-readable portable storage medium and an aspect of being transmitted through communication means in a wired or wireless manner may be applied.

The tap detecting process program is realized by a software configuration using a computer executing the program, but the present disclosure is not limited thereto. For example, at least a part of the tap detecting process program may be realized by a hardware configuration employing an application specific integrated circuit (ASIC) or combination of the hardware configuration and the software configuration.

The flowchart illustrated in FIG. 7 begins from the timing when a new tap detection period ΔtT is started after the previous tap detection period ΔtT is ended. In the embodiment, the tap detecting process program illustrated in FIG. 7 may be set to be continuously executed by the main CPU 40 or the like.

First, in Step S100, 0 is substituted for a variable i, and an initialization process is performed. The variable i is a counter for counting the number of tap operation times.

In Step S102, data representing a change in time of the acceleration signal va, that is, time-series data of the acceleration signal va is acquired from the acceleration sensor 30.

In Step S104, it is determined whether a count time of a timer tim exceeds (ΔtS+ΔtT). When the determination is positive, a value of i at that time point is substituted for N in the subsequent Step S106 and the timer tim is reset and ended in step S108.

The timer tim is a timer which starts from the time when one-side threshold value excess occurs. N is a factor representing the number of taps which is the number of tap operation times detected in the tap detection period ΔtT. The number of taps N may be stored, for example, in the RAM 24.

Meanwhile, when the determination is negative in Step S104, the process transfers to Step S110, and it is determined whether one-side threshold value excess is detected. When the determination is positive, the process transfers to Step S112, and the timer tim is started at the time when one-side threshold value excess occurs as the start time. Meanwhile, when the determination is negative, the process transfers to Step S104. In Step S110, during the period (ΔtS+ΔtT), it waits until one-side threshold value excess occurs. Accordingly, even when the oscillation of the acceleration signal va which does not reach the threshold value ThL or the threshold value ThH occurs, the oscillation is ignored.

In Step S114, it is determined whether both-side threshold value excess is detected. When the determination is positive, the process transfers to Step S120, and when the determination is negative, the process transfers to Step S116.

In Step S116, it is determined whether the count time by the timer tim exceeds the upper limit Δt2. When the determination is negative, that is, in the case of tim≤Δt2, the process returns to Step S114, and it waits until both-side threshold value excess is detected. Meanwhile, when the determination is positive, the timer tim is reset in Step S118, the process returns to Step S104, and the detection of one-side threshold value excess is performed again. The reason is because it is determined that it is the vibration not caused by the tap operation.

Meanwhile, in Step S120, it is determined whether the count time by the timer tim is equal to or more than the lower limit Δt1. When the determination is negative, that is, in the case of Δtim<Δt1, the timer tim is reset in Step S126, the process returns to Step S104, and the detection of the one-side threshold value excess is performed again. The reason is because it is considered that both-side threshold value excess is detected by the oscillation of the narrow pulse width not caused by the tap operation.

Meanwhile, when the determination is positive in Step S120, the process transfers to Step S122, and the value of the counter i is increased by 1 increment. The reason is because it is considered that the determination time width Δt of the pulse causing both-side threshold value excess satisfies Formula (3) by the process up to here, and the tap pulse caused by the tap operation occurs.

In Step S124, it waits until the count time of the timer tim elapses by ΔtS+ΔtM. The time ΔtS+ΔtM is a protective time not to erroneously detect the tap pulse as described above. When the tap pulses are detected multiple times, the protective time (the time (t5−t4) illustrated in FIG. 5) in the single tap is omitted, and the following Formula (4) may be a determination formula of the lapse of protective time.

$$tim > \Delta t2 + \Delta tM \qquad \text{Formula (4)}$$

After the protective time elapses, the process transfers to Step S126, the timer tim is reset, the process transfers to Step S104, and the detection of one-side threshold value excess is performed.

In the portable terminal device 10 according to the embodiment, as the process after detecting the tap operation by the tap detecting process program, for example, the main CPU 40 reads the number of taps N from the RAM 24, and may cause the portable terminal device 10 to perform an operation corresponding to the number of taps N.

As described above, according to the semiconductor device, the portable terminal device, and the operation detecting method of the embodiment, it is possible to suppress the erroneous detection, and to rapidly detect an operation.

In the embodiment, the description has been made about the tap detecting process of detecting the tap operations multiple times as an example, but the present disclosure is not limited thereto, and one tap operation, that is, only the single tap operation may be detected.

What is claimed is:

1. A semiconductor device comprising:

an input unit to which an acceleration signal is input from an acceleration detecting unit installed in a portable terminal device, the acceleration signal indicating a value of acceleration of the portable terminal device as (velocity/time); and a detection unit which detects that a tap operation is performed on the portable terminal device, in a case in which the acceleration signal input to the input unit reaches both of a first threshold value set on a positive side and a second threshold value set on a negative side, and a period until an absolute value of the acceleration signal exceeds any one of the first threshold value and the second threshold value and then exceeds an other of the first threshold value and the second threshold value is equal to or more than a predetermined first period and is equal to or less than a second period larger than the predetermined first period, wherein the acceleration signal generated by the acceleration detecting unit based on the tap operation includes a first pulse having a first peak on a side of the one of the first threshold value and the second threshold value, and a second pulse having a second peak on a side of the other of the first threshold value and the second threshold value subsequent to the first pulse, and a time width of the first pulse is larger than a time width of the second pulse.

2. The semiconductor device according to claim 1, wherein the first threshold value is less than a peak value on the negative side of the acceleration signal generated by the acceleration detecting unit by vibration caused in a case in which a user walks with the portable terminal device, and the second threshold value is larger than a peak value on the positive side of the acceleration signal generated by the acceleration detecting unit by vibration caused in the case in which the user walks with the portable terminal device.

3. The semiconductor device according to claim 1, wherein the predetermined first period is larger than a period of the acceleration signal generated by the acceleration detecting unit by vibration with a period less than that of vibration based on the tap operation.

4. The semiconductor device according to claim 1, wherein the second period is less than a period of the acceleration signal generated by the acceleration detecting unit by vibration caused in a case in which a user walks with the portable terminal device.

5. The semiconductor device according to claim 1, wherein the first predetermined period is equal to or less than the time width of the first pulse.

6. The semiconductor device according to claim 1, wherein the detection unit detects that a next tap operation is performed in a case in which a plurality of tap operations are detected, and the next tap operation is performed again before a predetermined period elapses after the tap operation is performed.

7. The semiconductor device according to claim 6, wherein after the detection unit detects that the tap operation is performed, the detection unit does not perform the detection on the next tap operation performed during the predetermined period.

8. A portable terminal device comprising:

the semiconductor device according to claim 1;

the acceleration detecting unit which inputs the acceleration signal to the input unit; and a control unit which performs a process corresponding to the tap operation based on a detection result of the detection unit.

9. An operation detecting method comprising:

inputting an acceleration signal from an acceleration detecting unit installed in a portable terminal device, the acceleration signal indicating a value of acceleration of the portable terminal device as (velocity/time); and detecting that a tap operation is performed on the portable terminal device, in a case in which the acceleration signal reaches both of a first threshold value set on a positive side and a second threshold value set on a negative side, and a period until an absolute value of the acceleration signal exceeds any one of the first threshold value and the second threshold value and then exceeds an other of the first threshold value and the second threshold value is equal to or more than a predetermined first period and is equal to or less than a second period larger than the predetermined first period, wherein the acceleration signal generated by the acceleration detecting unit based on the tap operation includes a first pulse having a first peak on a side of the one of the first threshold value and the second threshold value, and a second pulse having a second peak on a side of the other of the first threshold value and the second threshold value subsequent to the first pulse, and a time width of the first pulse is larger than a time width of the second pulse.

* * * * *